(12) United States Patent
Yun et al.

(10) Patent No.: US 12,296,659 B2
(45) Date of Patent: May 13, 2025

(54) DOOR DEVICE FOR VEHICLE

(71) Applicants: Hyundai Motor Company, Seoul (KR); Kia Corporation, Seoul (KR)

(72) Inventors: Hyungin Yun, Whasung-Si (KR); Chungsik Yim, Whasung-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 392 days.

(21) Appl. No.: 17/901,592

(22) Filed: Sep. 1, 2022

(65) Prior Publication Data
US 2023/0202269 A1  Jun. 29, 2023

(30) Foreign Application Priority Data
Dec. 29, 2021 (KR) .................. 10-2021-0190833

(51) Int. Cl.
*B60J 5/04* (2006.01)
*E05B 81/00* (2014.01)
*E05B 83/38* (2014.01)
*E05B 85/24* (2014.01)

(52) U.S. Cl.
CPC .......... *B60J 5/0463* (2013.01); *B60J 5/0479* (2013.01); *E05B 81/00* (2013.01); *E05B 83/38* (2013.01); *E05B 85/243* (2013.01)

(58) Field of Classification Search
CPC ....... B60J 5/0463; B60J 5/0479; E05B 83/38; E05B 81/00; E05B 85/243
See application file for complete search history.

(56) References Cited

U.S. PATENT DOCUMENTS

| 7,520,557 | B2 * | 4/2009 | Yoshida | B60J 5/06 296/187.12 |
| 7,918,492 | B2 * | 4/2011 | Elliott | E05D 3/125 296/146.12 |
| 9,849,759 | B2 * | 12/2017 | Lovelace | E06B 3/362 |
| 12,122,223 | B2 * | 10/2024 | Liepold | B60J 5/0458 |
| 2012/0049577 | A1 | 3/2012 | Thomas et al. | |
| 2020/0338974 | A1 * | 10/2020 | Lee | B60J 10/86 |

* cited by examiner

*Primary Examiner* — Joseph D. Pape
(74) *Attorney, Agent, or Firm* — Morgan, Lewis & Bockius LLP (57) ABSTRACT

A door device includes a door configured to open or close a door opening formed in a vehicle body, a guide pin provided at a lower end portion of the door and extending toward a lower end portion of the vehicle body, and a guide module provided on the lower end portion of the vehicle body and slidably coupled with the guide pin as the guide pin is inserted in the guide module.

14 Claims, 9 Drawing Sheets

DOOR DEVICE FOR VEHICLE

CROSS-REFERENCE TO RELATED APPLICATION

The present application claims priority to Korean Patent Application No. 10-2021-0190833 filed on Dec. 29, 2021, the entire contents of which is incorporated herein for all purposes by this reference.

BACKGROUND OF THE PRESENT DISCLOSURE

Field of the Present Disclosure

The present disclosure relates to a door device for a vehicle. More particularly, the present disclosure relates to a door device which prevents late deformation and sagging of a door in a vehicle applied with an opposed swing door in which a front door and a rear door swing in opposite directions.

Description of Related Art

In general, a vehicle has a vehicle compartment having a predetermined size capable of accommodating a driver or a fellow rider, and a vehicle compartment opening/closing door is provided in the vehicle body to open or close the vehicle compartment.

Figure 1:
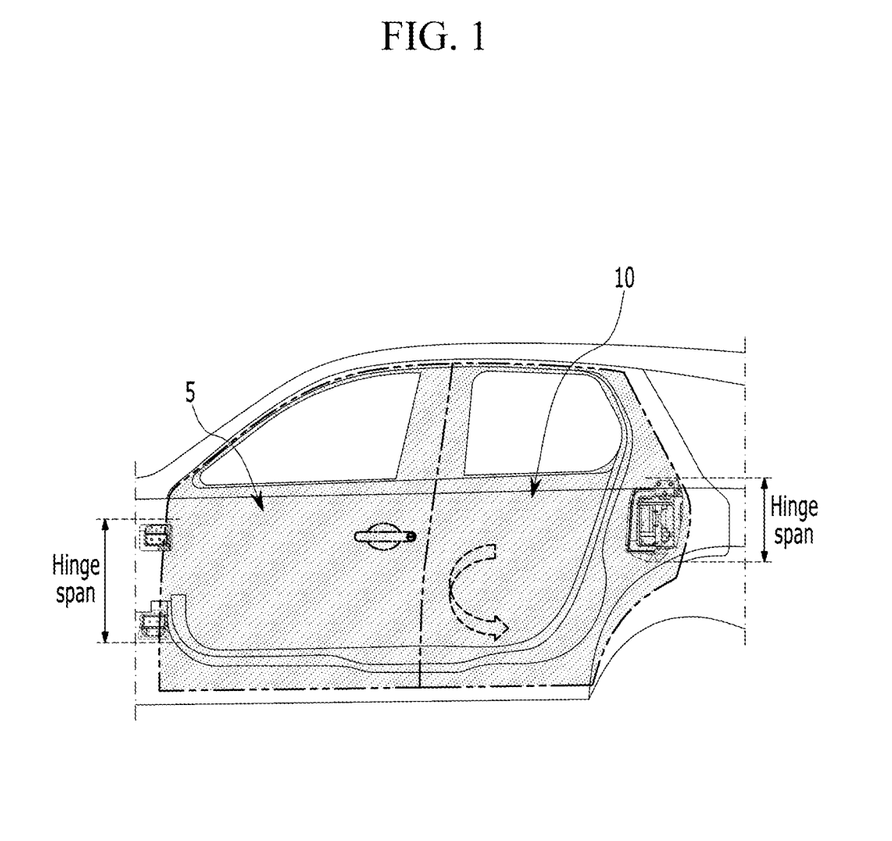
FIG. 1 is a diagram illustrating a front door, a rear door, and a hinge span space of a vehicle in a related art.

As shown in FIG. 1, in the case of a passenger vehicle, the vehicle compartment opening/closing door includes a front door 5 provided in the front in the longitudinal direction of the vehicle and a rear door 10 provided in the rear in the longitudinal direction of the vehicle, and the front door 5 and the rear door 10 are usually rotatably provided in the vehicle body by hinges.

The opposed swing door applied to a vehicle without a center pillar has merits such as favorable open feeling because there is no structure that blocks a middle portion of the vehicle when the front door 5 and the rear door 10 are opened. However, there is no center pillar support structure while lacking a space (hinge span) for a hinge configuration on a side of the rear door 10. Thus, sagging or late deformation of the rear door 10 may occur due to insufficient hinge strength. Accordingly, there is a problem in that the quality of the vehicle deteriorates due to a defective closing of the rear door 10 and a defective gap step.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing door structure of a vehicle to prevent sagging or late deformation of a door through door opening and closing by coupling a guide pin provided on the door and a guide module provided on a vehicle body.

Various aspects of the present disclosure are directed to providing a door device for a vehicle including a door configured to open or close a door opening formed in a vehicle body, a guide pin provided at a lower end portion of the door and extending toward a lower end portion of the vehicle body, and a guide module provided on the lower end portion of the vehicle body and slidably coupled with the guide pin as the guide pin is inserted in the guide module.

A first end portion of the guide pin may penetrate through a lower end panel surface of the door and may be fixed by a nut.

A second end portion of the guide pin may be formed in a hemispherical shape and provided to be in contact with an internal surface of the guide module.

The guide pin may be manufactured by heterogeneous injection molding of steel and plastic.

The guide module may include a guide body fixed on a lower end panel of the vehicle body, a guide slit formed at a center portion of the guide body in a longitudinal direction of the vehicle body, the guide pin configured to be inserted through an opened portion of the guide slit, a catcher rotatably provided on the guide body and configured to restrain the guide pin not to deviate from the guide slit after the guide pin is inserted into the guide slit, and a first lever rotatably provided on the guide body and selectively engaged with the catcher to lock the catcher.

A first hook may be formed in the catcher to be engaged with the guide pin at a side of the opened portion of the guide slit.

The first hook may have an inclined surface so that the catcher is configured to rotate when the guide pin enters the opened portion of the guide slit and comes in contact with the inclined surface of the first hook.

A second hook may be formed in the catcher to be engaged and locked with the first lever after the guide pin completes entry to the opened portion of the guide slit.

The catcher may have elastic force to be rotated to its original position when coupling between the second hook and the first lever is released.

The guide slit may be formed to have an inclination angle with respect to the longitudinal direction of the vehicle body.

The door device for a vehicle according to various exemplary embodiments of the present disclosure may further include a actuator configured to provide power to rotate the first lever.

A second lever extending toward the first lever may be formed on a central axis of the actuator. The second lever may rotate by rotation of the actuator to pull a hinge bar connected to the first lever, and the catcher may be rotated due to rotation of the first lever.

The hinge bar may be fixed to one end portion of the first lever and an edge portion of a rotation plate which is disposed on the guide body and rotates around an axis of the first lever.

The door may be a rear door provided at the rear in the longitudinal direction of the vehicle body.

According to various exemplary embodiments of the present disclosure, by adopting a coupling structure of the guide pin provided on the door and the guide module provided on the vehicle body, it is possible to prevent door sagging due to the limitation in space insufficient for the hinge configuration of the opposite swing door as well as problems such as defective door gap step and defective closing due to late deformation.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, with reference to the accompanying drawings, various exemplary embodiments of the present disclosure will be described in detail so that a person of an ordinary skill in the art to which an exemplary embodiment of the present disclosure pertains may easily implement the same. The present disclosure may be implemented in various different forms and is not limited to the exemplary embodiments described herein.

Furthermore, in various exemplary embodiments of the present disclosure, constituent elements having the same configuration are typically described in an exemplary embodiment with the same reference numerals, and only configurations different from the exemplary embodiment of the present disclosure will be described in other exemplary embodiments of the present disclosure.

It is noted that the drawings are schematic and not drawn to scale. Relative dimensions and ratio of parts in the drawings are shown in enlarged or reduced size for clarity and convenience in the drawings, and any dimension is merely illustrative but not limiting. In addition, the same reference numerals are used to indicate similar features to the same structure, element, or part shown in two or more drawings. When a part is referred to as being "above" or "on" another part, the part may be directly on the other part or another part may be involved therebetween.

Various exemplary embodiments of the present disclosure specifically represents various exemplary embodiments of the present disclosure. As a result, numerous variations of the diagram are expected. Accordingly, the exemplary embodiment of the present disclosure is not limited to a specific form of the illustrated area, and includes, for example, modification in the form by manufacturing.

Hereinafter, a structure of a door device for a vehicle according to various exemplary embodiments of the present disclosure will be described in detail with reference to the accompanying drawings.

Figure 2A:
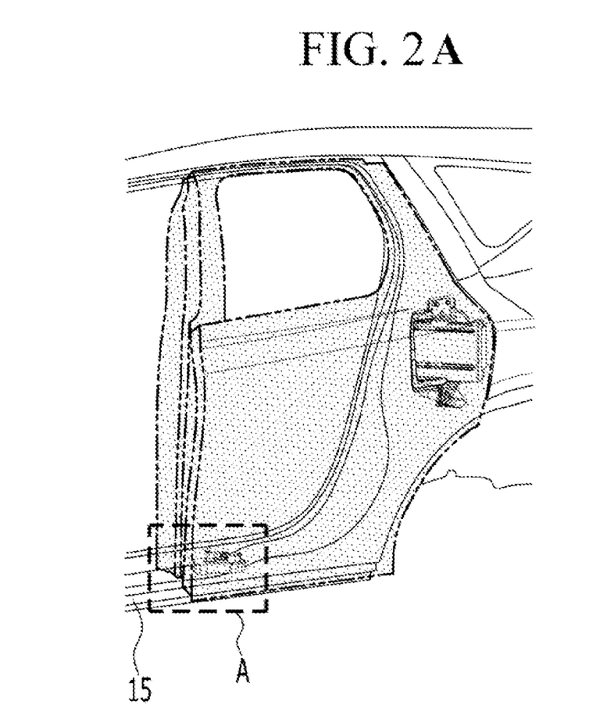
FIG. 2A and FIG. 2B are diagrams schematically illustrating a door device for a vehicle according to various exemplary embodiments of the present disclosure.
Figure 2B:
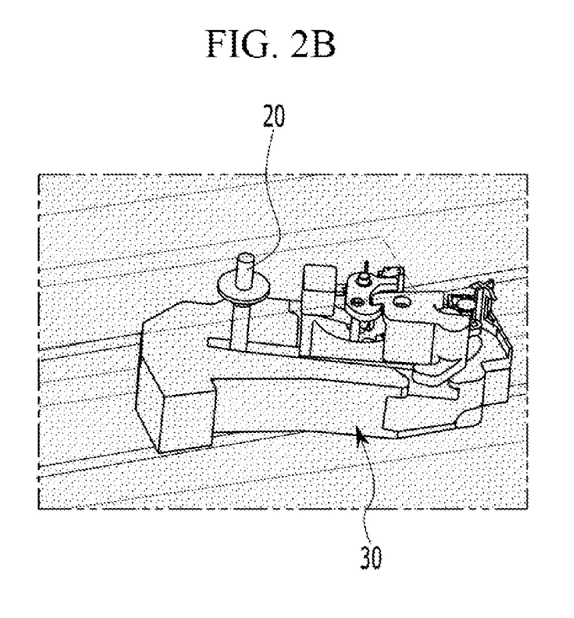
Figure 3:
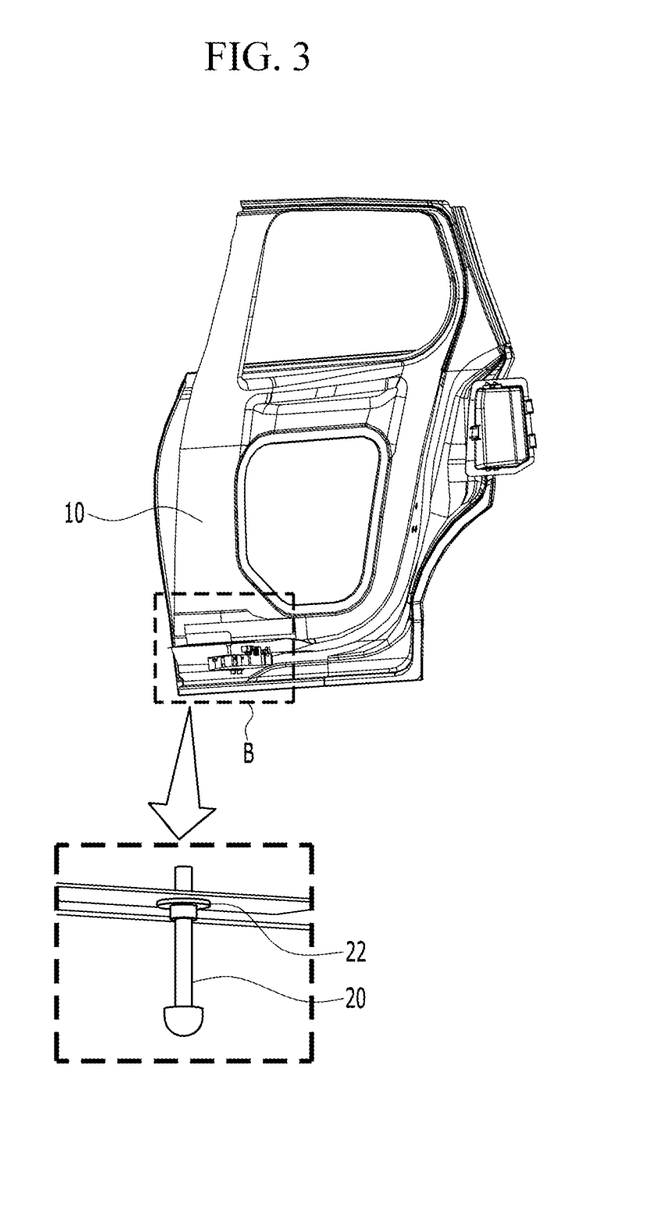
FIG. 3 is a diagram illustrating a state in which a guide pin of a door device for a vehicle according to various exemplary embodiments of the present disclosure is provided on a door.
Figure 4A:
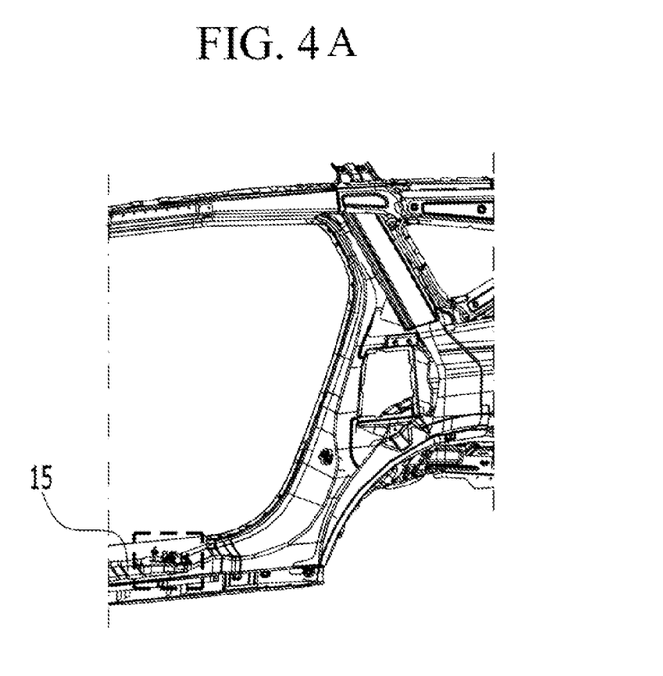
FIG. 4A, FIG. 4B and FIG. 4C are diagrams illustrating a state in which a guide module of a door device for a vehicle according to various exemplary embodiments of the present disclosure is provided on a vehicle body.
Figure 4B:
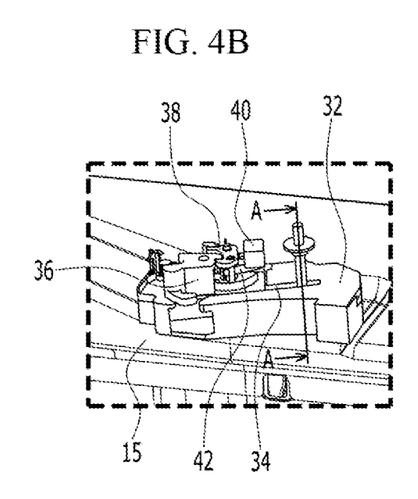
Figure 4C:
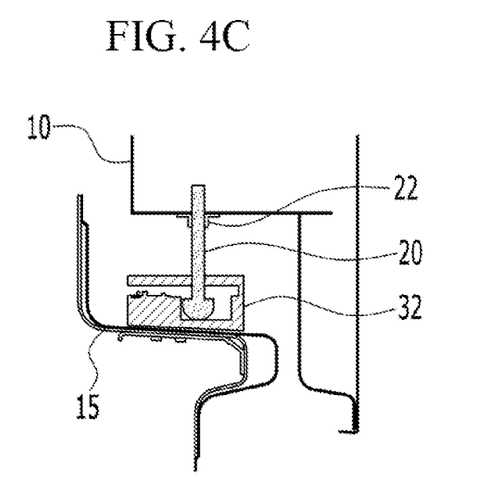

FIG. 1 is a diagram illustrating a front door, a rear door, and a hinge span space of a vehicle in a related art, FIG. 2A and FIG. 2B are diagrams schematically illustrating the door device for the vehicle according to various exemplary embodiments of the present disclosure, FIG. 3 is a diagram illustrating a state in which a guide pin of the door device for the vehicle according to various exemplary embodiments of the present disclosure is provided on a door, and FIG. 4A, FIG. 4B and FIG. 4C are diagrams illustrating a state in which a guide module of the door device for the vehicle according to various exemplary embodiments of the present disclosure is provided on a vehicle body.

As shown in FIG. 1, the door of the vehicle includes the front door 5 provided in the front in a longitudinal direction of the vehicle and the rear door 10 provided in the rear in a longitudinal direction of the vehicle, wherein the front door 5 and the rear door 10 are rotatably provided on the vehicle body by hinges. Due to insufficiency of space for the hinge configuration (hinge span) at the side of the rear door 10, sagging or late deformation of the rear door 10 may occur.

In various exemplary embodiments of the present disclosure as shown in FIG. 2A and FIG. 2B, a coupling structure of a guide pin 20 and a guide module 30 provided on the side of the rear door 10 has been referred to as an exemplary embodiment of the present disclosure, but the present disclosure is not limited thereto. The coupling structure of the guide pin 20 and the guide module 30 may also be applied to the side of the front door 5.

Referring to FIG. 2A and FIG. 2B, the door device for a vehicle according to various exemplary embodiments of the present disclosure includes the door 10 opening and closing a door opening formed in a vehicle body 15, the guide pin 20 provided at the lower end portion of the door 10, and the guide module 30 provided on the lower end portion of the vehicle body 15. As shown in FIG. 2A, the guide pin 20 and the guide module 30 are provided at a position corresponding to each other at the lower end portion of the door 10 and the lower end portion of the vehicle body 15, respectively. As shown in FIG. 2B, when the door 10 is closed, the guide pin 20 is inserted into a guide slit 34 formed in the guide module 30 to be coupled with each other so that the guide pin 20 is configured to slide along the guide slit 34.

Referring to FIG. 3, one end portion of the guide pin 20 may penetrate through the lower end panel surface of the door 10 to be fixed by a nut 22. The other end portion of the guide pin 20 is provided in a form extending toward the lower end portion of the vehicle body 15, and the end portion of the other end portion of the guide pin 20 is a portion inserted into the guide module 30 to be formed in a hemispherical shape. As shown in FIG. 4C, the end portion of the other end portion of the guide pin 20 formed in a hemispherical shape may be inserted into the guide module 30 to be in contact with an internal surface of the guide module 30. On the other hand, the guide pin 20 may be manufactured by heterogeneous injection molding of steel and plastic.

Referring to FIG. 4A, FIG. 4B and FIG. 4C, the guide module 30 includes a guide body 32, the guide slit 34, a catcher 36, and a first lever 38.

As shown in FIG. 4B, the guide body 32 is fixed on the lower end panel of the vehicle body 15, and the guide slit 34 is formed at the center portion of the guide body 32 in the longitudinal direction of the vehicle body 15. One portion of the guide slit 32 is opened while the other portion is closed by the guide body 32. The guide pin 20 is inserted into an opened portion of the guide slit 34, and the guide pin 20 may be slidably moved within the guide slit 34. The guide slit 34 is formed to have an inclination angle with respect to the longitudinal direction of the vehicle body 15 so that the guide pin 20 may perform natural movement along the guide slit 34 when the door 10 slidably moves.

The catcher 36 is rotatably provided on the guide body 32 and positioned on an opened portion of the guide slit 34. After the guide pin 20 is inserted into the guide slit 34, the catcher 36 closes the opened portion of the guide slit 34 to restrain the same, so that the guide pin 20 does not deviate from the guide slit 34.

The first lever 38 is rotatably provided on the guide body 32 and engaged with the catcher 36 on the side of the catcher 36 to lock the same.

Figure 5A:
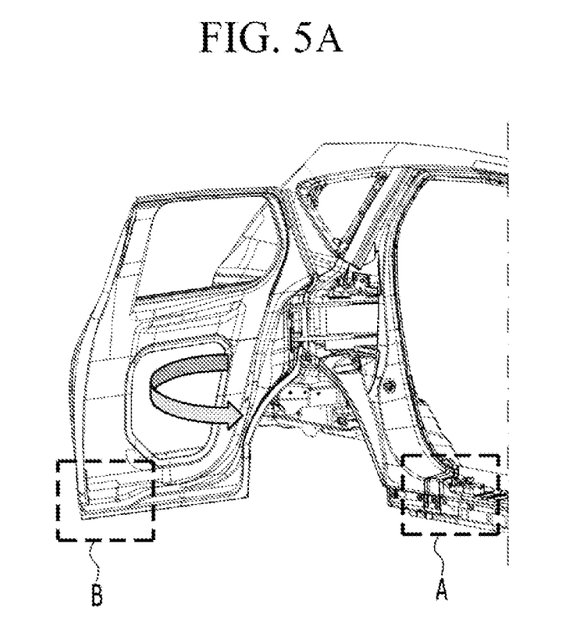
FIG. 5A, FIG. 5B and FIG. 5C are diagrams illustrating a door open state of a door device for a vehicle according to various exemplary embodiments of the present disclosure.
Figure 5B:
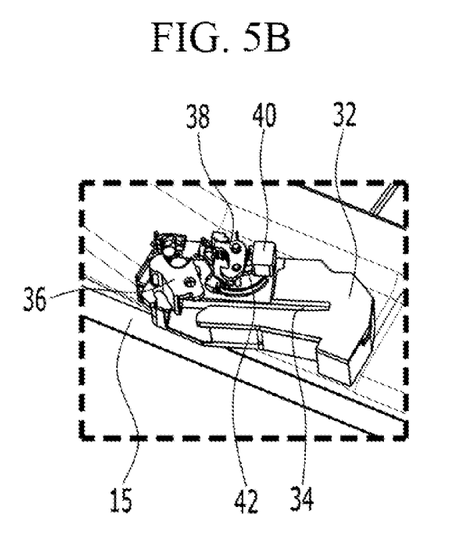
Figure 6A:
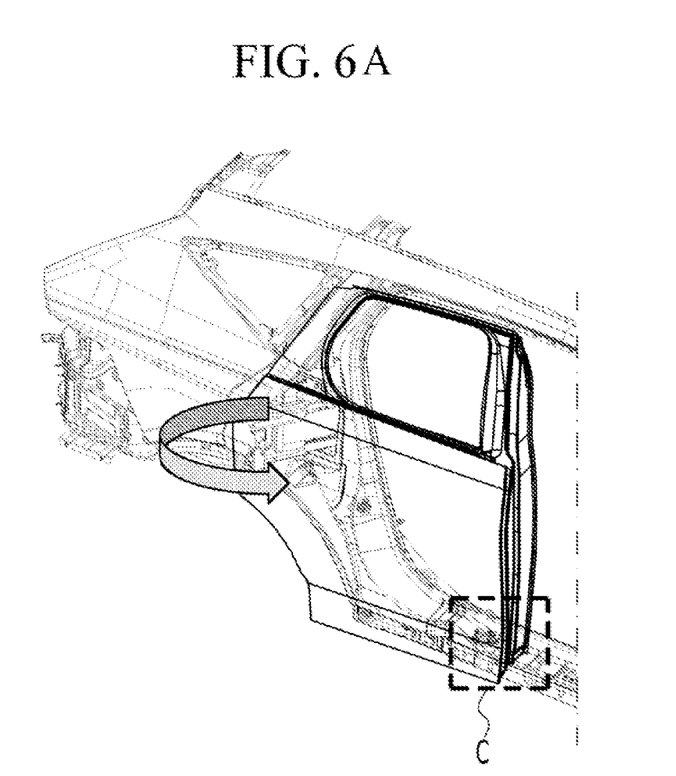
FIG. 6A, FIG. 6B and FIG. 6C are diagrams illustrating a door close swing state of a door device for a vehicle according to various exemplary embodiments of the present disclosure.
Figure 6B:
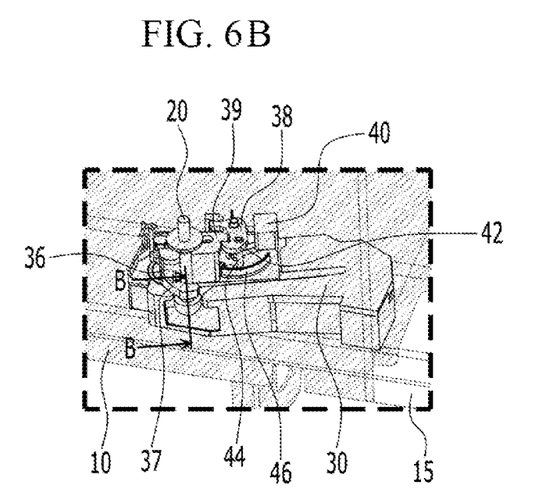
Figure 6C:
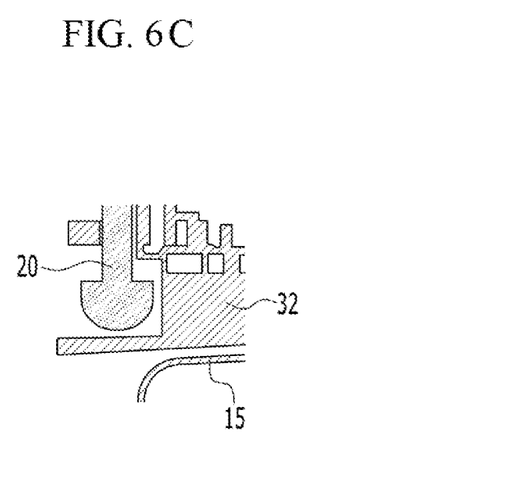

FIG. 5A and FIG. 5B are diagrams illustrating a door open state of a door device for a vehicle according to various exemplary embodiments of the present disclosure, and FIG. 6A, FIG. 6B and FIG. 6C are diagrams illustrating a door close swing state of the door device for the vehicle according to various exemplary embodiments of the present disclosure.

Figure 5C:
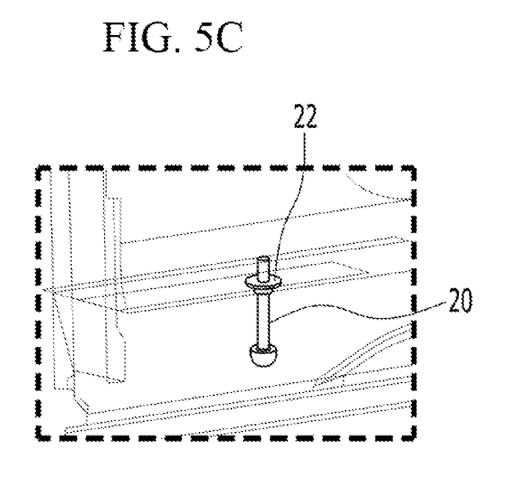

Referring to FIG. 5A, FIG. 5B and FIG. 5C, in the state where the door 10 is opened, the guide module 30 is positioned on the lower end panel of the vehicle body 15, and the guide pin 20 is positioned at the lower end portion of the door 10 in a form extending toward the lower end portion of the vehicle body 15.

When the door 10 rotates, the guide pin 20 positioned on the door 10 is coupled to the guide module 30 positioned on the vehicle body 15. At the instant time, the other end portion of the guide pin 20 is inserted into the guide slit 34 through the opened portion of the guide slit 34 of the guide module 30.

The guide pin 20 pushes the catcher 36 for rotation while entering to the guide slit 34. After the guide pin 20 completes the entry to the inside of the guide slit 34, the guide pin 20 is engaged and fixed to a first hook 37 formed on the catcher 36 formed on the side of the opened portion of the guide slit 34. The first hook 37 may have an inclined surface so that the catcher 36 may be rotated naturally when the guide pin 20 enters the opened portion of the guide slit 34 and comes in contact with the inclined surface of the first hook 37.

Furthermore, a second hook 39 is formed on the opposite side of the first hook 37 formed in the catcher 36, and the second hook 39 may make the catcher 36 locked with the first lever 38 by being engaged with the first lever 38 after the guide pin 20 completed the entry to the opened portion of the guide slit 34. The second hook 39 may have an inclined surface so that the first lever 38 may be rotated naturally when coming into contact with the first lever 38.

When the guide pin 20 enters the opened portion of the guide slit 34 to be locked, as shown in FIG. 6C, the other end portion of the guide pin 20 in a hemispherical shape is spaced from the internal bottom surface of the guide body 32 with a predetermined distance.

Figure 7A:
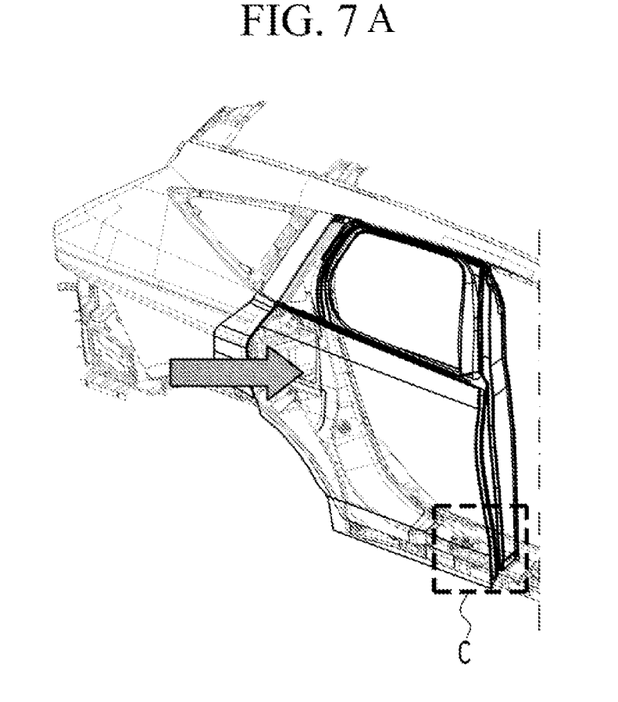
FIG. 7A, FIG. 7B and FIG. 7C are diagrams illustrating a door close sliding state of a door device for a vehicle according to various exemplary embodiments of the present disclosure.
Figure 7B:
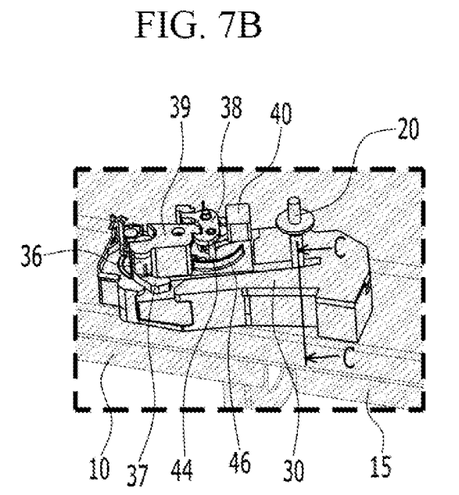
Figure 7C:
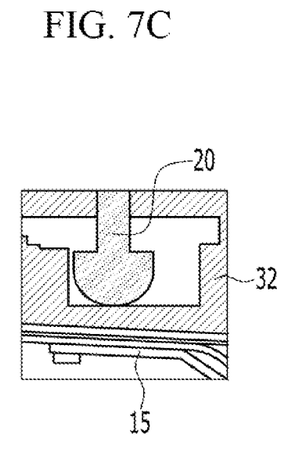

FIG. 7A, FIG. 7B and FIG. 7C are diagrams illustrating a door close sliding state of a door device for a vehicle according to various exemplary embodiments of the present disclosure.

Referring to FIG. 7A, FIG. 7B and FIG. 7C, in a state where the door 10 is rotated to couple the guide pin 20 to the guide module 30 so that the guide pin 20 is restrained within the guide slit 34 of the guide module 30, the door 10 slides toward the center portion of the vehicle body 15 and the guide pin 20 moves to the closed end portion of the guide slit 34, completing the closing of the door 10. At the instant time, as shown in FIG. 7C, the other end portion of the guide pin 20 in the hemispherical shape comes in contact with the internal bottom surface of the guide body 32 to be supported and becomes in a state in which the guide pin 20 supports the door 10, preventing the sagging of the door 10 downward.

Figure 8A:
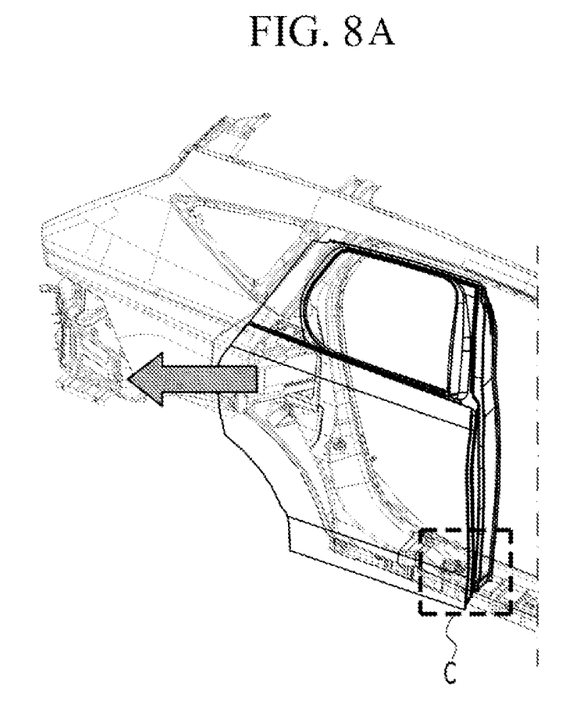
FIG. 8A and FIG. 8B are diagrams illustrating a door open sliding state of a door device for a vehicle according to various exemplary embodiments of the present disclosure.
Figure 8B:
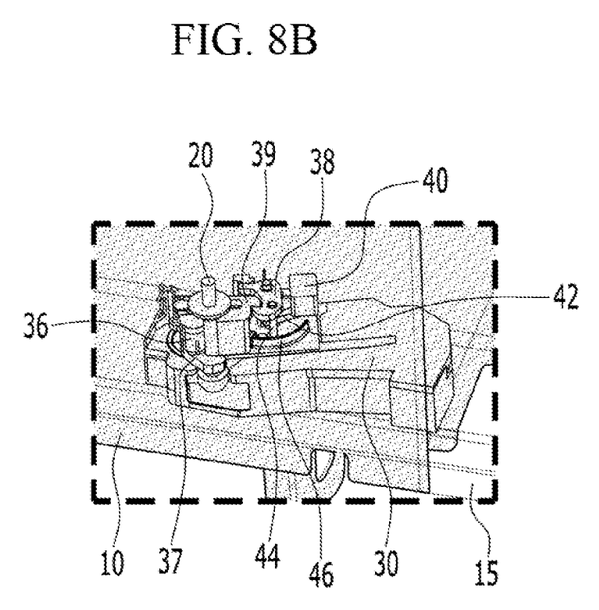
Figure 9A:
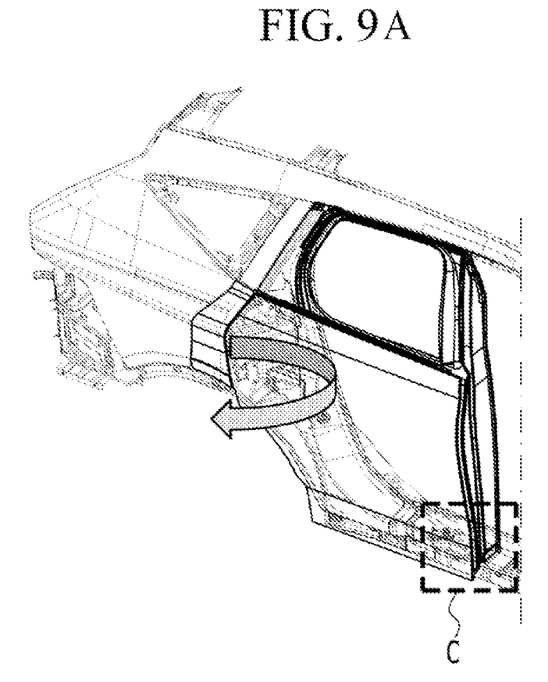
FIG. 9A and FIG. 9B are diagrams illustrating a door open swing state of a door device for a vehicle according to various exemplary embodiments of the present disclosure.
Figure 9B:
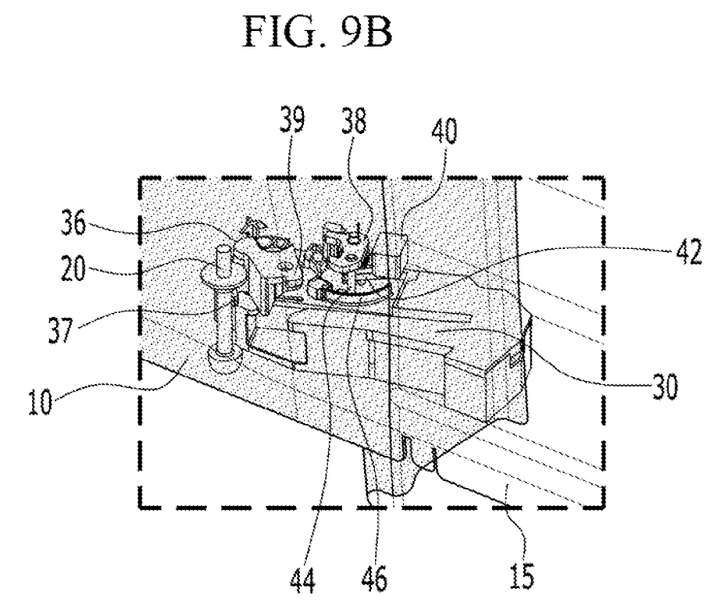

FIG. 8A and FIG. 8B are diagrams illustrating a door open sliding state of a door device for a vehicle according to various exemplary embodiments of the present disclosure, and FIG. 9A and FIG. 9B are diagrams illustrating a door open swing state of a door device for a vehicle according to various exemplary embodiments of the present disclosure.

Referring to FIG. 8A and FIG. 8B, in the open sliding of the door 10, in a state where the guide pin 20 is restrained within the guide slit 34 of the guide module 30, the door 10 slides toward the front of the vehicle body 15 to make the guide pin 20 moved from the closed end portion in the guide slit 34 to the opened portion of the guide slit 34. At the instant time, the guide pin 20 is engaged with the first hook 37, and the first lever 38 is in a state of being locked with the catcher 36.

The door device for the vehicle according to various exemplary embodiments of the present disclosure may further include a motor 40 which provides power to rotate the first lever 38. The motor 40 may rotate the first lever 38 so that the first lever 38 and the second hook 39 formed on the catcher 36 are disengaged.

A second lever 42 extending toward the first lever 38 is formed on the central axis of the motor 40, and when the motor 40 rotates, the second lever 42 rotates to pull a hinge bar 44 connected to the first lever 38. Accordingly, the catcher 36 is rotated as the first lever 38 rotates. At the instant time, the hinge bar 44 may be fixed to one end portion of the first lever 38 and to an edge portion of a rotation plate 46 which is disposed on the guide body 32 and rotates around the axis of the first lever 38. Accordingly, the rotation of the motor 40, the rotation of the second lever 42, the rotation of the rotation plate 46, and the rotation of the first lever 38 are sequentially performed to release the locking of the first lever 38 and the catcher 36.

As the locking of the first lever 38 and the catcher 36 is released, the guide pin 20 moves to the outside of the opened portion of the guide slit 34, and the engagement of the guide pin 20 by the first hook 37 is released. Accordingly, the coupling of the guide pin 20 with the guide module 30 is released. Furthermore, the catcher 36 may have an elastic force to rotate to the original position when the coupling between the second hook 39 and the first lever 38 is released.

Thereafter, as shown in FIG. 9, the door 10 rotates toward the outside of the vehicle body, and the opening of the door 10 is completed.

As described above, according to various exemplary embodiments of the present disclosure, by adopting the coupling structure of the guide pin provided on the door and the guide module provided on the vehicle body, it is possible to prevent door sagging due to the limitation in the space insufficient for the hinge configuration of the opposite swing door as well as problems such as defective door gap step and defective closing due to late deformation.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A door apparatus for a vehicle, the door apparatus comprising:
    a door configured to open or close a door opening formed in a vehicle body;
    a guide pin provided at a lower end portion of the door and extending toward a lower end portion of the vehicle body; and
    a guide module provided on the lower end portion of the vehicle body and slidably coupled with the guide pin as the guide pin is inserted in the guide module,
    wherein the guide module includes:
        a guide body fixed on a lower end panel of the vehicle body;
        a guide slit formed at a center portion of the guide body in a longitudinal direction of the vehicle body, the guide pin configured to be inserted through an opened portion of the guide slit;
        a catcher rotatably provided on the guide body and configured to restrain the guide pin not to deviate from the guide slit after the guide pin is inserted into the guide slit; and
        a first lever rotatably provided on the guide body and selectively engaged with the catcher to lock the catcher.

2. The door apparatus of claim 1, wherein a first end portion of the guide pin is provided to penetrate through a lower end panel surface of the door and is fixed by a nut.

3. The door apparatus of claim 2, wherein a second end portion of the guide pin is formed in a hemispherical shape and provided to be in contact with an internal surface of the guide module.

4. The door apparatus of claim 1, wherein the guide pin is manufactured by heterogeneous injection molding of steel and plastic.

5. The door apparatus of claim 1, wherein a first hook is formed in the catcher to be selectively engaged with the guide pin at a side of the opened portion of the guide slit.

6. The door apparatus of claim 5, wherein the first hook has an inclined surface so that the catcher is configured to rotate when the guide pin enters the opened portion of the guide slit and comes in contact with the inclined surface of the first hook.

7. The door apparatus of claim 5, wherein a second hook is formed in the catcher to be engaged and locked with the first lever after the guide pin completes entry to the opened portion of the guide slit.

8. The door apparatus of claim 7, wherein the catcher has elastic force to be rotated to an original position of the catcher when coupling between the second hook and the first lever is released.

9. The door apparatus of claim 1, wherein the guide slit is formed to have an inclination angle with respect to the longitudinal direction of the vehicle body.

10. The door apparatus of claim 1, further including:
    an actuator configured to provide power to rotate the first lever.

11. The door apparatus of claim 10, wherein the actuator is a motor.

12. The door apparatus of claim 10,
    wherein a second lever extending toward the first lever is formed on a central axis of the actuator, and
    wherein the second lever rotates by rotation of the actuator to pull a hinge bar connected to the first lever, and the catcher is rotated due to rotation of the first lever.

13. The door apparatus of claim 12, wherein the hinge bar is fixed to one end portion of the first lever and an edge portion of a rotation plate which is disposed on the guide body and rotates around an axis of the first lever.

14. The door apparatus of claim 1, wherein the door is a rear door provided at the rear in the longitudinal direction of the vehicle body.

* * * * *